(12) United States Patent
Assa et al.

(10) Patent No.: US 6,990,115 B2
(45) Date of Patent: Jan. 24, 2006

(54) QUEUE CONTROL METHOD AND SYSTEM

(75) Inventors: Eyal Assa, Hod Hasharon (IL); David Berechya, Tel Mond (IL)

(73) Assignee: Seabridge Ltd., Hod Hasharon (IL)

( * ) Notice: Subject to any disclaimer, the term of this patent is extended or adjusted under 35 U.S.C. 154(b) by 820 days.

(21) Appl. No.: 09/793,366

(22) Filed: Feb. 26, 2001

(65) Prior Publication Data

US 2002/0163885 A1 Nov. 7, 2002

(51) Int. Cl.
*H04L 12/54* (2006.01)
(52) U.S. Cl. .................... 370/417; 370/230.1
(58) Field of Classification Search ............... 370/230, 370/230.1, 235, 235.1, 238.1, 412, 413, 414, 370/416, 417, 418
See application file for complete search history.

(56) References Cited

U.S. PATENT DOCUMENTS

| | | | |
|---|---|---|---|
| 5,541,912 A | 7/1996 | Choudhury et al. | |
| 5,764,641 A | 6/1998 | Lin | |
| 5,831,971 A | 11/1998 | Bonomi et al. | 370/230 |
| 5,864,540 A | 1/1999 | Bonomi et al. | 370/235 |
| 5,901,139 A | 5/1999 | Shinohara | |
| 5,901,147 A | 5/1999 | Joffe | |
| 6,011,775 A | 1/2000 | Bonomi et al. | 370/230 |
| 6,014,367 A | 1/2000 | Joffe | |
| 6,034,945 A | 3/2000 | Hughes et al. | |
| 6,044,060 A | 3/2000 | Jones | |
| 6,049,527 A | 4/2000 | Isoyama et al. | |
| 6,076,112 A | 6/2000 | Hauser et al. | |
| 6,081,504 A | 6/2000 | Tanaka et al. | |
| 6,091,708 A | 7/2000 | Matsunuma | |
| 6,091,725 A | 7/2000 | Cheriton et al. | |
| 6,317,416 B1 * | 11/2001 | Giroux et al. | 370/232 |
| 6,359,861 B1 * | 3/2002 | Sui et al. | 370/230 |
| 6,396,843 B1 * | 5/2002 | Chiussi et al. | 370/418 |
| 6,496,516 B1 * | 12/2002 | Dabecki et al. | 370/460 |
| 6,590,900 B1 * | 7/2003 | Peting et al. | 370/428 |
| 6,721,325 B1 * | 4/2004 | Duckering et al. | 370/395.4 |
| 6,724,767 B1 * | 4/2004 | Chong et al. | 370/412 |
| 6,728,792 B2 * | 4/2004 | Wagner | 710/6 |

OTHER PUBLICATIONS

Jennifer L. Rexford et al., "*Hardware-Efficient Fair Queueing Architectures for High-Speed Networks*" IEEE 1996, pp. 638-647.

H. Jonathan Chao, "*A Novel Architecture for Queue Management in the ATM Network*", IEEE 1991, pp. 1110-1118.

(Continued)

*Primary Examiner*—John Pezzlo
*Assistant Examiner*—Donald Mills
(74) *Attorney, Agent, or Firm*—Fitch, Even, Tabin & Flannery

(57) ABSTRACT

A queue control system and method for scheduling fixed size traffic elements for transmission on a link from a number of queues. The system comprises a memory, queues and queue processor. The memory stores a linear array, where each array index corresponds to a transmission priority and is capable of referencing a list of queues. Each queue has an assigned weight and an associated calculation remainder variable stored in a memory. Queues referenced by a low value array index are selected for transmission before queues referenced by higher value array index. The queue processor is arranged so that to repetitively select a queue for transmission in dependence on the referenced position of the queue in the array, and to operate a predetermined function for moving the reference to a queue selected for transmission to a new array index.

15 Claims, 4 Drawing Sheets

OTHER PUBLICATIONS

Manolis Katevenis et al., "*Weighted Round-Robin Cell Multiplexing in a General-Purpose ATM Switch Chip*", IEEE 1991, pp. 1265-1279.

Hanoch Levy, "*Allocation of Server Time Among Multiple ATM Sessions: the Use of Fair Queuing*", Dec. 10, 1997, p. 1-12.

\* cited by examiner

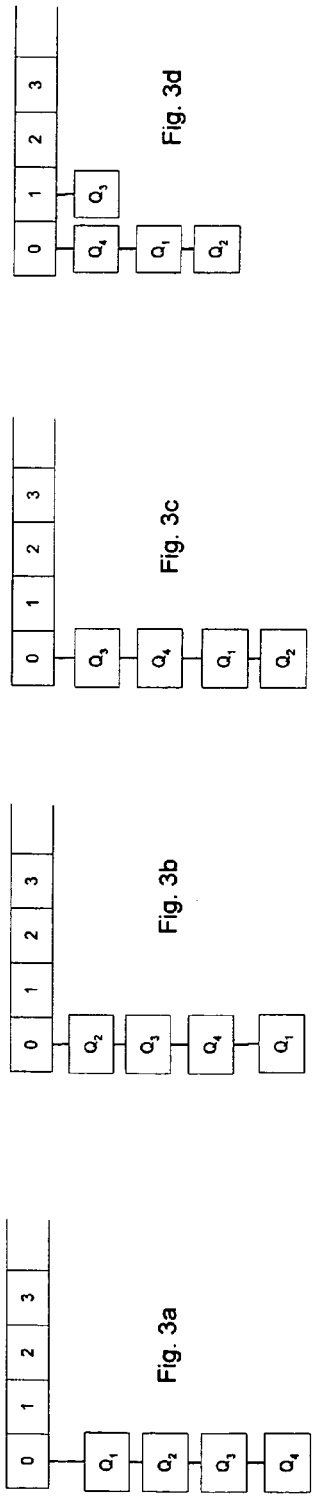
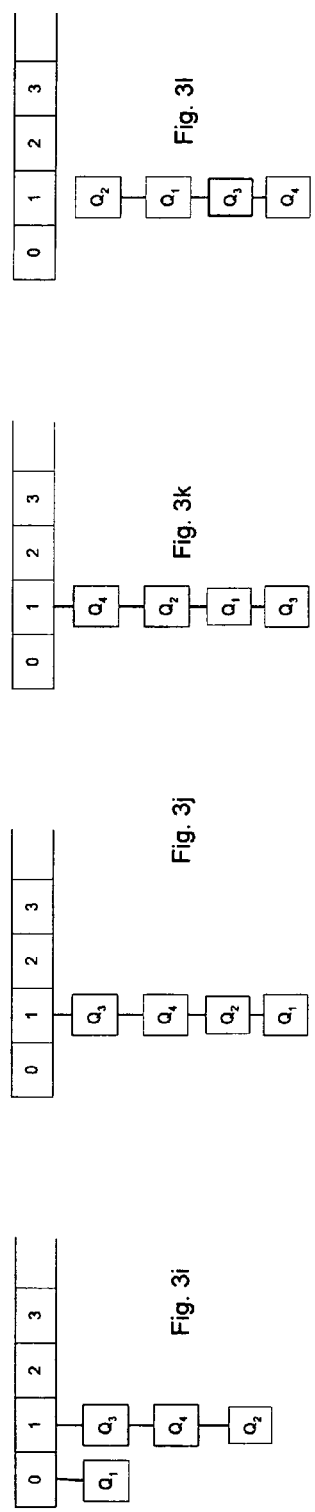

QUEUE CONTROL METHOD AND SYSTEM

FIELD OF THE INVENTION

The present invention is in the general field of communication traffic queue control and in particular relates to an improvement to the weighted fair queue algorithm.

BACKGROUND OF THE INVENTION

Networks are used to transfer voice, video and data between various network devices. Network devices such as switches are located within networks to direct the transfer of network traffic between various devices. Network traffic is typically bursty in nature. In order to compensate for network traffic bursts, memory queues are incorporated into network devices. These allow the device to temporarily store traffic when the incoming rate is higher than an available outgoing rate. When more than one queue has traffic and each queue is contending for the same bandwidth, some of the traffic is required to wait in the queues and some mechanism is needed to determine how traffic contention is resolved.

In order to resolve contention and provide a Quality of Service guarantee or some method of fair contention resolution to traffic, queue management algorithms must be implemented in the network devices. In one algorithm referred to as "priority queuing", contending queues are assigned different priorities and traffic is forwarded from the queues in strict priority order. For example, referring to FIG. 1, four queues $Q_1$, $Q_2$, $Q_3$ and $Q_4$ (designated 1–4 respectively) hold packetised traffic that is to be forwarded on link (20). The link (20) has a finite bandwidth $R_L$ that must be shared by the traffic. To resolve the contention, the queues are prioritized and packets from the queues are forwarded to the link (20) in strict priority order under the control of a queue manager (10), such as a switch. While priority queuing works well when there is little contention, where there is contention, traffic from higher priority queues is forwarded at the expense of traffic from lower priority queues. In this situation, lower priority queues might be totally blocked since the priority mechanism allows the high priority queue to transmit traffic any time when the queue is not empty.

One algorithm that attempts to resolve issues surrounding contention management without the above problems is "Weighted Fair Queuing" (WFQ). Contending queues are assigned weights and packets are forwarded from queues in proportion to the weights assigned to each queue. For example, referring again to FIG. 1, the four queues are assigned a weight that represents the amount of bandwidth that is reserved for that queue. If the total available bandwidth of the link were 100 bytes per second, then with queue weights assigned as 20%, 25%, 15% and 40% to $Q_1$, $Q_2$, $Q_3$ and $Q_4$ respectively, $Q_1$ would be allocated 20 bytes per second on the link, $Q_2$ would be allocated 25 bytes per second, $Q_3$ 15 bytes per second and $Q_4$ 40 bytes per second. By using a WFQ mechanism the rate of each queue is guaranteed and queues cannot starve each other. In one implementation of the weighted fair queue algorithm, a linear array is defined. Each array element represents a transmission time on the outgoing link. Queues are scheduled by linking them to one of the elements in the array, the order of transmission being determined by the order of the queues in the array. Once a transmission is made from a queue according to the schedule, the position of the queue within the array is recalculated. The recalculation schedules the queue further along the array, the exact position being calculated in dependence on the queue's assigned weight.

Whilst the basic Weighted Fair Queue algorithm works well for preventing starvation that occurs in priority queuing and establishes a maximum flow rate for each queue, link bandwidth is often wasted because the percentage of link bandwidth reserved for a particular queue is reserved whether or not there are packets waiting. There is no apparent way of distributing excess bandwidth between other queues because queues do not have priority assigned relative to one another.

The number of weights supported is important in WFQ system—it determines the ratio between the highest bandwidth (BW) supported to the lowest bandwidth supported. A WFQ system with a large number of weights supports a large variety of different bandwidths. The number of weights also determines the granularity, granularity being the proportion of bandwidth each weight represents:

$$\text{Granularity} = \frac{\{BW\_of\_weight\_N\} \{BW\_of\_weight\_(N\ 1)\}}{BW\_of\_weight\_N}$$

Obviously, a system is more efficient if the granularity is fine because a weight that is assigned to a queue is likely to represent a bandwidth closer to that required. Where granularity is coarse, each increase in weight is likely to correspond to a large increase in bandwidth and therefore it is unlikely a close match to the bandwidth requirement can be found. The number of weights that can be used and the granularity between the weights is dependent on the size of the array. Obviously, the larger the array the more complex the processing of the WFQ algorithm becomes and the more memory or logic elements are needed to support the system. Thus, there exists a trade-off between the number of weights and their respective granularity and the processing speed of the system.

Implementing traffic management in high-speed network nodes like routers or switches requires high-speed hardware or software. The WFQ algorithm must complete calculations within a cell time (in high speed lines of speeds of 622 mb/s or above this is less then 1 $\mu$s). However, the complexity of algorithms such as WFQ inhibits their use in high-speed switches which must select a cell for transmission every few microseconds (or less). In addition, it is difficult to scale the algorithm to tens of thousands of connections multiplexed onto a single link without increasing the selection time for each cell.

With the advent of high speed links and small cell sizes, modem networking devices, such as switches, require efficient hardware and corresponding algorithms to process cell arrivals in an extremely short space of time. However, at present there exists a trade-off between cell selection time and the scalability such algorithms.

It may also be desirable for a queue management algorithm to be work conserving, i.e. where there is waiting traffic in queues, scheduling calculations should be completed within a cell time in order to prevent wasted transmission times on the link. A large number of queues should also be supported—this is essential in a per-VC or a per-flow node. If implemented in a logic gate system such as ASIC or FPGA, a low number of logic gates should be used to limit cost and complexity and increase processing speed Furthermore, in weighted algorithms such as weighted fair queuing, a large number of weights should be supported in order to support incoming links with varying bandwidths.

Scheduling methods of this type is particularly relevant to ATM (Asynchronous Transfer Mode) networks. However, most types of network, such as IP, now offer some kind of Quality of Service (QoS) to which such scheduling methods are relevant. ATM supports several classes of services: CBR (Constant Bit Rate); VBR (Variable Bit Rate); ABR (Available Bit Rate); GFR (Guaranteed Frame Rate) and UBR (Unspecified Bit Rate). Traffic in ATM is divided into fixed size cells. Traffic may be sensitive to delay and delay variation. Connections may require traffic below an agreed rate to be guaranteed to be delivered. Connections normally have some form of agreed maximum transmission rate. However this is not always the case and traffic may in these cases be delivered on a best-effort basis.

U.S. Pat. No. 5,831,971 issued to Lucent Technologies, Inc. discloses a traffic management system based on a combination of leaky bucket traffic shaping and weighted fair queuing collision arbitration. Virtual finishing times based on the time a cell transmission would have completed under idealized fair queuing is used to select cells awaiting transmission. A selected cell is only transmitted is the leaky bucket shaper determines that the cell conforms to the agreed traffic contract. Non-conforming cells are re-assigned a new virtual finishing time and left in a queue for transmission.

U.S. Pat. No. 5,864,540 issued to AT&T Corp./CSI Zeinet and U.S. Pat. No. 6,011,775 issued to AT&T Corp. disclose traffic shaping methods for packet-switched networks in which leaky bucket traffic shaping is combined with weighted round robin scheduling. Incoming traffic is queued in separate queues which are served on a round robin basis in dependence on a priority calculated from the traffic's bandwidth. Cells selected from the queues are only transmitted if the transmission satisfies the leaky bucket approximation of the agreed traffic contract.

STATEMENT OF INVENTION

According, to one aspect of the present invention, there is provided a queue control method for scheduling fixed size traffic elements for transmission on a link from a number of queues, each queue having an assigned weight determined in dependence on predetermined characteristics of the queue and an associated calculation remainder variable, a linear array being maintained in a memory, each array index corresponding to a transmission priority and being capable of referencing a list of queues, queues referenced by a low value array index being selected for transmission before queues referenced by higher value array index, wherein the queue control method comprises the steps of:

selecting the first queue referenced by the lowest array index for transmission and, moving the reference to the queue selected for transmission to a new array index, the new array index being calculated by a predetermined function using the current array index referencing the queue, the queue's weight and the queue's calculation remainder variable value as parameters.

The present invention seeks to provide an improved WFQ (Weighted Fair Queue) algorithm that seeks to answer the above problems and requirements. The algorithm is particularly suitable for a fast, efficient implementation in logic-element-based hardware whilst using a limited number of logic elements.

In relation to ATM, the present invention seeks to offer a method of scheduling traffic for guaranteed unbounded traffic like nrt-VBR2.3, ABR and GFR. In VBR2.3 the network has to guarantee delivery of cells from CLP0 (Cell Loss Priority 0) and to attempt to deliver CLP 1 cells. In ABR the network has to guarantee delivery of traffic that does not exceed MCR (Minimum Cell Rate) and to attempt to deliver traffic that exceeds MCR In GFR the network has to guarantee delivery of traffic that does not exceed MCR (Minimum Cell Rate) and to attempt to deliver traffic that exceeds MCR.

The present invention can be used in cell-based networks like ATM (Asynchronous Transfer Mode), and in other networks having fixed size PDUs (Protocol Data Units). It can also be applied to networks like IP (Internet Protocol) if adapted to accommodate the network's variable size PDUs.

The main advantages of the method of the present invention are:

- A large number of queues may be supported
- A large number of weights may be supported (in a practical implementation thousands)
- The method offers a shorter rescheduling calculation time compared to similar algorithms because a relatively small array is used A system in accordance with the method can be implemented using a small count of logic elements/gates in ASIC (Application Specific Integrated Circuits) or FPGA (Field Programmable Gate Array).

In the present invention an array of size K is used to implement a WFQ-based system with L weights where L>K. In WFQ systems known from the above described art that use linear arrays a queue cannot be rescheduled for transmission at the current array index. In the present invention, the system implemented allows a queue to be rescheduled for transmission at the current array index. Where a queue cannot be rescheduled at the current array index, a longer array will be needed because a queue will always be moved at least one position down the array each time it is processed. In contrast, in the present invention it is possible that a queue is rescheduled to the same array index a number of times before being moved down the array. It will be seen that this reduces implementation of the system considerably. According to another aspect of the present invention, there is provided a queue control system for scheduling fixed size traffic elements for transmission on a link from a number of queues, each queue having an assigned weight and an associated calculation remainder variable stored in a memory, the system comprising a memory storing a linear array, each array index corresponding to a transmission priority and being capable of referencing a list of queues, queues referenced by a low value array index being selected for transmission before queues referenced by higher value array index, and a queue processor arranged to repetitively select a queue for transmission in dependence on each queue's referenced position in the array, wherein the queue processor is arranged to operate a predetermined function for moving the reference to the queue selected for transmission to a new array index, the new array index being calculated using the current array index referencing the queue, the queue's weight and the queue's calculation remainder variable value as parameters.

BRIEF DESCRIPTION OF THE DRAWINGS

For a better understanding, the invention will now be described, by way of example only, with reference to the accompanying drawings, in which.

DETAILED DESCRIPTION OF A PREFERRED EMBODIMENT

Figure 1:
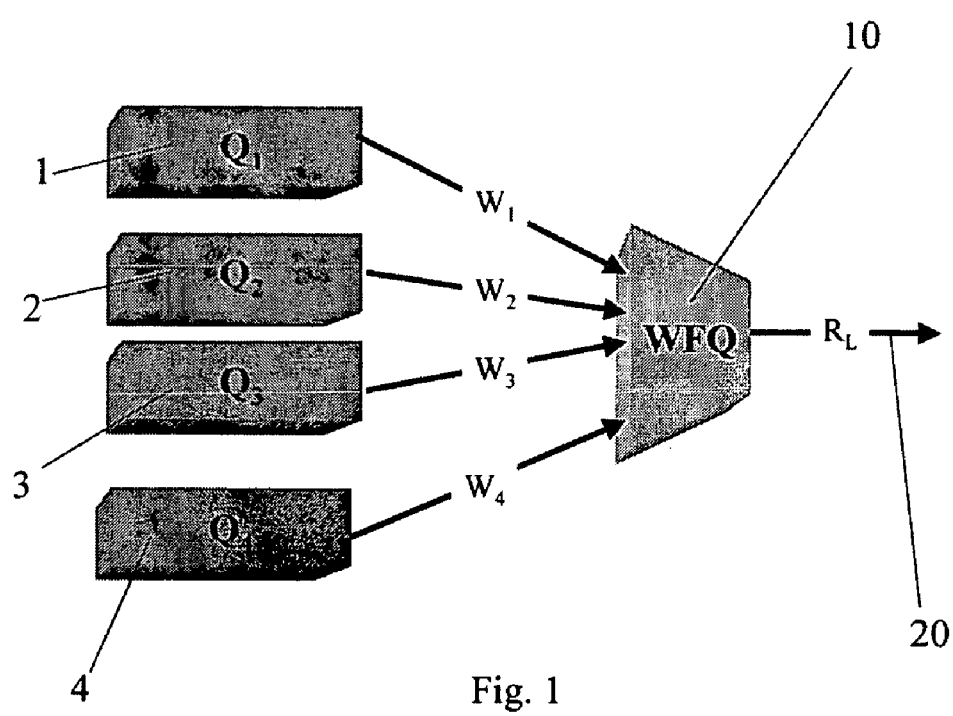
FIG. 1 is a schematic diagram of a traffic multiplexing system.

Referring again to FIG. 1, a weight is assigned to each queue (1–4). The bandwidth of the link (20) is $R_L$. This is shared between the queues (1–4) according to the weights; the lowest weight corresponding to the highest bandwidth and vice-versa. The total link bandwidth is shared among the queues, $R_1$ being the transmission rate of queue $Q_1$ and so on such that $$\sum_i R_i = R_L, \text{ where}$$

$$\frac{Ri}{Rj} = \frac{Wj}{Wi}$$

Therefore, if the transmission rate (bandwidth) Of $Q_2$ is twice that of $Q_1$, the weight assigned to $Q_1$ is twice the weight assigned to $Q_2$.

The lowest possible weight is 1 whilst the highest possible weight is L. The value of L must be pre-selected, taking into account the types of connections expected and other performance criteria that will be discussed later.

A linear array of size K is used; each entry in the array is capable of referencing a list of queues. Queues referenced in the array are selected for transmission on the link (20) in dependence on their position in the array. A queue referenced at array index 0 will be selected for transmission before one referenced at array index 1 and so forth. Once a queue is selected for transmission of a cell, the queue's index in the array is recalculated.

A number of local and global variables are used for the calculation (or recalculation) of the index of a queue in the array. The current index (CI) holds the current index in the array from which a queue has just been selected for transmission. It is a global binary variable with a size of $\log_2 K$. After all of the queues that are linked to the position pointed by the CI have been served, CI is moved to the next non-empty index at which a queue is referenced. The calculated index (CAI) is a variable in which the new index of the queue in the array is set. The calculated index is a variable with size of $\log_2 K$. Once CAI is calculated, the reference to the queue in the array is moved to the index CAI. Finally, the queue index ($QI_x$) is a local variable associated with each queue ($QI_1$ being associated with queue $Q_1$ and so on). Each variable $QI_x$ has a size $\log_2 (L/K)$ and corresponds to the remainder, if any, from a previous calculation.

Upon initialization, CI and all the $QI_x$ local variables are set to 0. The initial index for a queue is determined, taking the queues with traffic pending in some arbitrary fashion. As and when a cell arrives in a queue, if the queue was empty and therefore not referenced in the array, an array index is determined and a reference to the array is added to the array at the calculated index.

Figure 2:
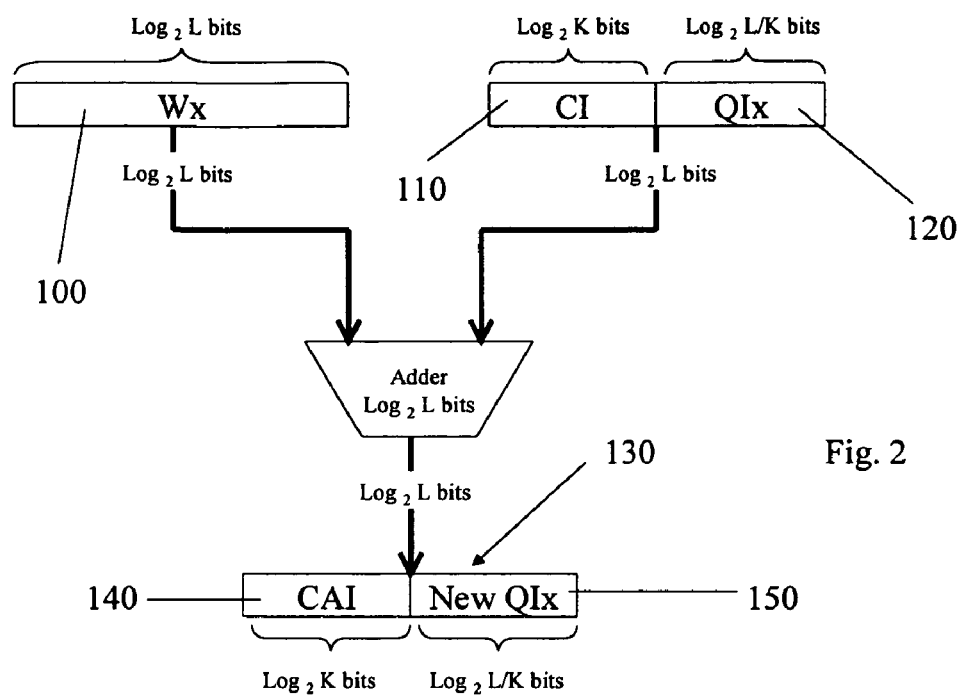
FIG. 2 illustrates the operation of the system in accordance with the present invention; and, FIG. 3 is a series of block diagrams illustrating the processing of multiple queues according to the present invention.

The same calculation is used to determine a queue's initial index and for determination of a queue's new index after it has been selected for transmission. The calculation is illustrated in FIG. 2.

A binary calculation is made, adding the weight associated with the queue (in the form of a $\log_2 L$ length binary number, designated as 100) to a binary number made up of CI (in the form of a $\log_2 K$ binary number, designated as 110) and the queue's respective QI value (in the form of a $\log_2 L/K$ binary number, designated as 120). A temporary variable tmp (designated as 130) is used to store this value.

$$tmp = \{(CI*L/K + QIx + Wx)\} \text{ modulo } L$$

CAI is determined by taking the first (most significant) $\log_2 K$ bits (140) of tmp and the new value for QI is determined by taking the remaining (least significant) $\log_2 L/K$ bits (150) of tmp.

It can be seen from the calculations above that if the weight (Wx) is high, the next transmission time will be scheduled further away than if the weight is low.

Figure 3M:
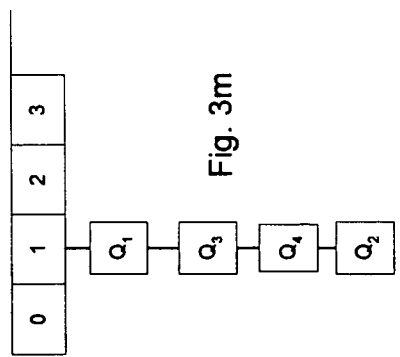
Figure 3N:
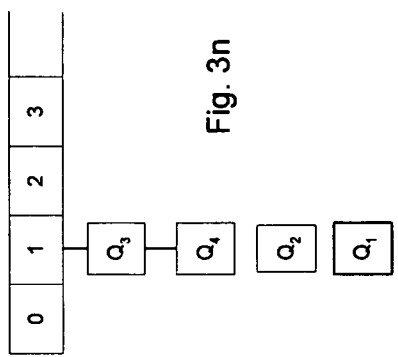
Figure 3O:
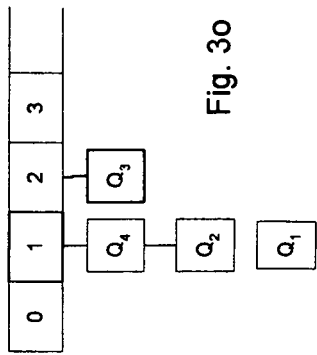
Figure 3P:
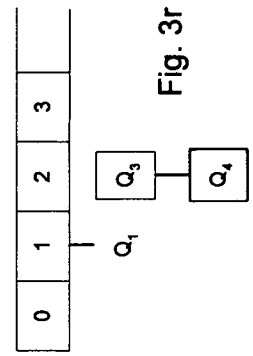
Figure 3Q:
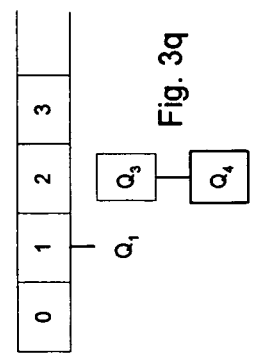
Figure 3R:
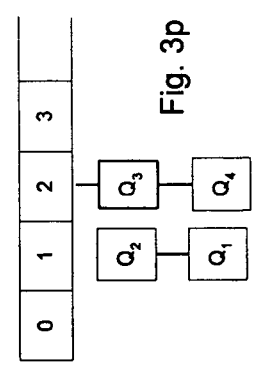

FIGS. 3a to 3r illustrates the operation of the above algorithm for a number of prioritised queues.

The system variables are set as follows:
L=256 ($\log_2 L=8$)
K=32 ($\log_2 K=5$)
($\log_2 L/K=3$)
$R_L=8$ The example is based on 4 incoming queues $Q_1$ to $Q_4$. The characteristics of each queue are shown in Table 1 as follows:

TABLE 1

| Queue | No. Cells to Transmit | Assigned Weight | Bandwidth of Queue (Ri) |
|---|---|---|---|
| $Q_1$ | 10 | 1 | ½ $R_L$ |
| $Q_2$ | 5 | 2 | ¼ $R_L$ |
| $Q_3$ | 10 | 4 | ⅛ $R_L$ |
| $Q_4$ | 5 | 4 | ⅛ $R_L$ |

At commencement, CI=0 and $QI_1$ to $QI_4$ (denoted $QI_i$ in the table where $_i$ corresponds to the Queue being recalculated)=0.

The initial index for each array is calculated as is shown in Table 1. This results in the array configuration shown in FIG. 3a.

TABLE 2

| | Calculation | | | Recalculated Parameters | | |
|---|---|---|---|---|---|---|
| CI Action | Weight$_i$ | CI QI$_i$ | f | CAI | QI$_i$ | FIG. |
| Set $Q_1$ array index | 00000001 | 00000000 | 00000001 | 0 | 1 | a |
| Set $Q_2$ array index | 00000010 | 00000000 | 00000010 | 0 | 2 | a |
| Set $Q_3$ array index | 00000100 | 00000000 | 00000100 | 0 | 4 | a |
| Set $Q_4$ array index | 00000100 | 00000000 | 00000100 | 0 | 4 | a |

The first queue selected for transmission is therefore $Q_1$ as it is the first queue encountered at the lowest array index. Once queue Q1 is selected for transmission, its index in the array must be recalculated. Adding its weight (00000001) to the binary number made up of CI (00000) and $QI_1$ (001) gives the number 00000010. Taking the first 5 digits for the value of the new array index CAI gives 0 whilst the last 3 digits set $QI_1$ to 2. Thus, queue $Q_1$ is rescheduled at the same index in the array (0). As there are already queues scheduled at that index, the reference to the queue is added to the end of the list, as is shown in FIG. 3b. This procedure is repeated ad-infinitum or until no cells remain for transmission in any of the queues.

Table 3 illustrates the scheduling of the above queues, the current array index CI being shown next to the action to be taken (eg. transmit queue $Q_1$ and recalculate index of $Q_1$). The far right column states the corresponding part of FIG. 3 that shows the array configuration at that point in time.

TABLE 3

| CI | Action | Calculation | | | Recalculated Parameters | | FIG. 3 |
|---|---|---|---|---|---|---|---|
| | | Weight$_i$ | CI QI$_i$ | f | CAI | QI$_1$ | |
| 0 | Transmit $Q_1$, recalc $Q_1$ | 00000001 | 00000001 | 00000010 | 0 | 2 | a |
| | Transmit $Q_2$, recalc $Q_2$ | 00000010 | 00000010 | 00000100 | 0 | 4 | b |
| | Transmit $Q_3$, recalc $Q_3$ | 00000100 | 00000100 | 00001000 | 1 | 0 | c |
| | Transmit $Q_4$, recalc $Q_4$ | 00000100 | 00000100 | 00001000 | 1 | 0 | d |
| | Transmit $Q_1$, recalc $Q_1$ | 00000001 | 00000010 | 00000011 | 0 | 3 | e |
| | Transmit $Q_2$, recalc $Q_2$ | 00000010 | 00000100 | 00000110 | 0 | 6 | f |
| | Transmit $Q_1$, recalc $Q_1$ | 00000001 | 00000011 | 00000100 | 0 | 4 | g |
| | Transmit $Q_2$, recalc $Q_2$ | 00000010 | 00000110 | 00001000 | 1 | 0 | h |
| | Transmit $Q_1$, recalc $Q_1$ | 00000001 | 00000100 | 00000101 | 0 | 5 | i |
| | Transmit $Q_1$, recalc $Q_1$ | 00000001 | 00000101 | 00000110 | 0 | 6 | i |
| | Transmit $Q_1$, recalc $Q_1$ | 00000001 | 00000110 | 00000111 | 0 | 7 | i |
| | Transmit $Q_1$, recalc $Q_1$ | 00000001 | 00000111 | 00001000 | 1 | 0 | i |
| 1 | Transmit $Q_3$, recalc $Q_3$ | 00000100 | 00001000 | 00001100 | 1 | 4 | j |
| | Transmit $Q_4$, recalc $Q_4$ | 00000100 | 00001000 | 00001100 | 1 | 4 | k |
| | Transmit $Q_2$, recalc $Q_2$ | 00000010 | 00001000 | 00001010 | 1 | 2 | l |
| | Transmit $Q_1$, recalc $Q_1$ | 00000001 | 00001000 | 00001001 | 1 | 1 | m |
| | Transmit $Q_3$, recalc $Q_3$ | 00000100 | 00001100 | 00010000 | 2 | 0 | n |
| | Transmit $Q_4$, recalc $Q_4$ | 00000100 | 00001100 | 00010000 | 2 | 0 | o |
| | Transmit $Q_2$ | 00000010 | 00001010 | 00001100 | 1 | 4 | p |
| | Transmit $Q_1$, recalc $Q_1$ | 00000001 | 00001001 | 00001010 | 1 | 2 | q |
| | Transmit $Q_1$ | 00000001 | 00001010 | 00001011 | 1 | 3 | r |

It can be seen from the above table that the scheduled transmission order for this example will be:

$Q_1$ $Q_2$ $Q_3$ $Q_4$ $Q_1$ $Q_2$ $Q_1$ $Q_2$ $Q_1$ $Q_1$ $Q_1$ $Q_1$ $Q_3$ $Q_4$ $Q_2$ $Q_1$ $Q_3$ $Q_4$ $Q_2$ $Q_1$ $Q_1$ $Q_3$ $Q_4$ $Q_3$ $Q_4$ $Q_3$ $Q_3$ $Q_3$ $Q_3$ $Q_3$

As we see $Q_1$ takes ½ of the link's BW (RL), $Q_2$ takes ¼, $Q_3$ and $Q_4$ take ⅛ each.

The method discussed herein could be used for scheduling in networks with other PDU types. For example, in a network having packet based PDUs of variable size, the recalculation should consider packet size. The calculation equation could be adapted for such situations as follows where Ln is the size of the packet transmitted.

$$tmp = \{(CI*L/K + QIx + Wx*Ln)\} \bmod{L}$$

The ratio between the number of weighs (L) and the size of the array determines the delay variation generated by the WFQ scheduler. A lower delay variation will be achieved if the array size is equal to the number of weights i.e. K=L. A priority encoder is used to find the next none empty position in the array after all of the queues link to the current CI have been served and rescheduled to another CI. However, a large array requires a large priority encoder for the calculation of the new CI (CAI). In turn, a large priority encoder consumes large number of gates and the calculation time is increased.

The method discussed above with reference to FIGS. 2 and 3 permits large numbers of weights, thereby allowing flexible bandwidth allocation. It is possible in the present invention to use a small array in order to decrease the calculation time and the logic gate count. However, by decreasing the size of the array the delay variation is increased. Hence, the use of a small array with large number of weights is only reasonable in non real-time traffic where low delay variation is not necessary.

The maximum usable weight is (L–K). The reason for this is that if weights above this maximum are used, scheduling operates incorrectly leading to queues with weights above this maximum being rescheduled for immediate transmission instead of being rescheduled after queues with lower weights.

It is possible to improve the above algorithm, in particular the granularity provided by the weights. The term granularity refers to the smallest bandwidth a weight can represent $$\text{Granularity} = \frac{\{BW\_of\_weight\_N\} \{BW\_of\_weight\_(N\ 1)\}}{BW\_of\_weight\_N}.$$

For example, if a link has a bandwidth of 155 Mb/s, if only two weights are used the smallest bandwidth that can be allocated is 77.5 Mb/s. This is said to have a granularity of 50%. Obviously as granularity becomes lower, more varying bandwidths of incoming links can be catered for. In the above example if one of the links had a bandwidth of 50 Mb/s, it would still be scheduled as if it were a link of bandwidth 77.5 Mb/s as no lower division is available. This would result in wastage of 27.5 Mb/s.

As described above, the lowest weight corresponds to the highest bandwidth while the highest weight corresponds to the lowest bandwidth. We can assign weights in different manners:

(1): Weight value 1 designates the link bandwidth ($R_L$). In this case the minimum BW supported will be $$\frac{LineRate\,(RL)}{MaximumWeight\,(L)}$$

Granularity will be coarse for high bandwidth links and fine for low bandwidth links (see table 4).

(2): In order to improve granularity for high bandwidth links weight value 10 designates the link bandwidth ($R_L$). In this case the minimum bandwidth supported will be $$10 \times \frac{LineRate\,(RL)}{MaximumWeight\,(L)}$$

Although the minimum bandwidth is worse than in (1), the overall granularity is much better (see table 5).

TABLE 4

| No Weights | Min bandwidth | Granularity |
|---|---|---|
| 1 | 155.000 | |
| 2 | 77.500 | 50.00% |
| 3 | 51.667 | 33.33% |
| 4 | 38.750 | 25.00% |
| 5 | 31.000 | 20.00% |
| 6 | 25.833 | 16.67% |
| 7 | 22.143 | 14.29% |
| 8 | 19.375 | 12.50% |
| 9 | 17.222 | 11.11% |
| 10 | 15.500 | 10.00% |
| 20 | 7.750 | 5.00% |
| 50 | 3.100 | 2.00% |
| 100 | 1.550 | 1.00% |
| 500 | 0.310 | 0.20% |

To improve granularity we can multiply each weight used by a magnification factor, n, and do not use the first n weights. Applying this to the above example, if n is set to 10:

TABLE 5

| No. Weights | Minimum bandwidth | Granularity |
|---|---|---|
| 10 | 155.000 | 10.00% |
| 20 | 77.500 | 5.00% |
| 50 | 31.000 | 2.00% |
| 100 | 15.500 | 1.00% |
| 500 | 3.100 | 0.20% |

What is claimed is:

1. A queue control method for scheduling fixed size traffic elements for transmission on a link from a number of queues, each queue having an assigned weight determined in dependence on predetermined characteristics of the queue and an associated calculation remainder variable, a linear array being maintained in a memory, each array index corresponding to a transmission priority and being capable of referencing a list of queues, queues referenced by a low value array index being selected for transmission before queues referenced by higher value array index; said queue control method comprises the steps of:
   selecting the first queue referenced by the lowest array index for transmission and,
   moving the reference to a queue selected for transmission to a new array index, the new array index being calculated by a predetermined function using a current array index referencing the queue, the queue's weight and the queue's calculation remainder variable value as parameters wherein the predetermined function is:

$Log_2K[\{CI*L/K+QIx+Wx\}$ modulo $L]$, where K is the size of the array, CI is the current array index referencing the queue, L is a predetermined system constant, QIx is the queue x's calculation remainder variable and Wx is queue x's weight.

2. A queue control method according to claim 1, further comprising the step of recalculating the value of queue's calculation remainder variable, the recalculation comprising a predetermined function using the current array index referencing the queue, the queue's weight and the queue's calculation remainder variable value as parameters.

3. A queue control method according to claim 2, in which the predetermined function is:

$Log_2L/K[\{CI*L/K+QIx+Wx\}$ modulo $L]$, where K is the size of the array, CI is the current array index referencing the queue, L is a predetermined system constant, QIx is the queue x's calculation remainder variable and Wx is queue x's weight.

4. A queue control method according to claim 3, in which L is a predetermined maximum assignable weight.

5. A queue control method according to claim 1, in which L is a predetermined maximum assignable weight.

6. A queue control method according to claim 1, further comprising the step of increasing the minimum assignable weight by a factor n to thereby increase granularity.

7. A queue control method for scheduling traffic elements with variable elements length Ln for transmission on a link from a number of queues, each queue having an assigned weight determined in dependence on predetermined characteristics of the queue and an associated calculation remainder variable, a linear array being maintained in a memory, each array index corresponding to a transmission priority and being capable of referencing a list of queues, queues referenced by a low value array index being selected for transmission before queues referenced by higher value array index; said queue control method comprises the steps of:
   selecting the first queue referenced by the lowest array index for transmission and,
   moving the reference to a queue selected for transmission to a new array index, the new array index being calculated by a predetermined function using a current array index referencing the queue, the queue's weight and the queue's calculation remainder variable value as parameters
   wherein the predetermined function is:

$Log_2K[\{CI*L/K+QIx+Wx*Ln\}$ modulo $L]$, where K is the size of the array, CI is the current array index referencing the queue, L is a predetermined system constant, QIx is the queue x's calculation remainder variable and Wx is queue x's weight.

8. A queue control method according to claim 7, further comprising the step of recalculating the value of queue's calculation remainder variable, the recalculation comprising the predetermined function:

$Log_2L/K[\{CI*L/K+QIx+Wx*Ln\}$ modulo $L]$, where K is the size of the array, CI is the current array index referencing the queue, L is a predetermined system constant, QIx is the queue x's calculation remainder variable and Wx is queue x's weight.

9. A computer-readable medium, on which is stored a computer program of instructions for a processor to schedule fixed size traffic elements for transmission on a link from a number of queues, each queue having an assigned weight determined in dependence on predetermined characteristics of the queue and an associated calculation remainder variable, the program being arranged to generate and maintain a linear array in a memory, each array index corresponding to a transmission priority and being capable of referencing a list of queues, queues referenced by a low value array index being selected for transmission before queues referenced by higher value array index, wherein the program comprises, in combination:

means for selecting the first queue referenced by the lowest array index for transmission and, means for moving the reference to a queue selected for transmission to a new array index, wherein the means for moving calculates the new array index by a predetermined function using a current array index referencing the queue, the queue's weight and the queue's calculation remainder variable value as parameters, wherein the predetermined function is:

$Log_2K[\{CI*L/K+QIx+Wx\} \text{ modulo } L]$, where K is the size of the array, CI is the current array index referencing the queue, L is a predetermined system constant, QIx is the queue x's calculation remainder variable and Wx is queue x's weight.

10. A field programmable gate array programmed to execute scheduling of fixed size traffic elements for transmission on a link from a number of queues, each queue having an assigned weight determined in dependence on predetermined characteristics of the queue and an associated calculation remainder variable, the array being arranged to generate and maintain a linear array in a memory, each array index corresponding to a transmission priority and being capable of referencing a list of queues, queues referenced by a low value array index being selected for transmission before queues referenced by higher value array index, wherein the program comprises the steps of:

selecting the first queue referenced by the lowest array index for transmission and, moving the reference to a queue selected for transmission to a new array index, wherein the program calculates the new array index by a predetermined function using a current array index referencing the queue, the queue's weight and the queue's calculation remainder variable value as parameters, wherein the predetermined function is:

$Log_2K[\{CI*L/K+QIx+Wx\} \text{ modulo } L]$, where K is the size of the array, CI is the current array index referencing the queue, L is a predetermined system constant, QIx is the queue x's calculation remainder variable and Wx is queue x's weight.

11. An application specific integrated circuit configured to execute scheduling of fixed size traffic elements for transmission on a link from a number of queues, each queue having an assigned weight determined in dependence on predetermined characteristics of the queue and an associated calculation remainder variable, the circuit being arranged to generate and maintain a linear array in a memory, each array index corresponding to a transmission priority and being capable of referencing a list of queues, queues referenced by a low value array index being selected for transmission before queues referenced by higher value array index, wherein the program comprises the steps of:

selecting the first queue referenced by the lowest array index for transmission and, moving the reference to a queue selected for transmission to a new array index, wherein the program calculates the new array index by a predetermined function using a current array index referencing the queue, the queue's weight and the queue's calculation remainder variable value as parameters, wherein the predetermined function is:

$Log_2K[\{CI*L/K+QIx+Wx\} \text{ modulo } L]$, where K is the size of the array, CI is the current array index referencing the queue, L is a predetermined system constant, QIx is the queue x's calculation remainder variable and Wx is queue x's weight.

12. A queue control system for scheduling fixed size traffic elements for transmission on a link from a number of queues, the system comprising:

a memory storing a linear array, each array index corresponding to a transmission priority and being capable of referencing a list of queues;

queues, each one having an assigned weight and an associated calculation remainder variable stored in a memory; said queues referenced by a low value array index being selected for transmission before queues referenced by higher value array index, and a queue processor arranged to repetitively select a queue for transmission in dependence on each queue's referenced position in the array and to operate a predetermined function for moving the reference to a queue selected for transmission to a new array index; the new array index being calculated using a current array index referencing the queue, the queue's weight and the queue's calculation remainder variable value as parameters, wherein the predetermined function is:

$Log_2K[\{CI*L/K+QIx+Wx\} \text{ modulo } L]$, where K is the size of the array, CI is the current array index referencing the queue, L is a predetermined system constant, QIx is the queue x's calculation remainder variable and Wx is queue x's weight.

13. A queue control system according to claim 12, in which each queue comprises a buffer.

14. A queue control system according to claim 12, in which the queue processor comprises an application specific integrated circuit.

15. A queue control system according to claim 12, in which the queue processor comprises a programmed field programmable gate array.

* * * * *